(12) United States Patent
Wu

(10) Patent No.: US 7,697,290 B2
(45) Date of Patent: Apr. 13, 2010

(54) ELECTRONIC APPARATUS AND FAN MODULE THEREOF

(75) Inventor: Chung-Hao Wu, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 12/357,655

(22) Filed: Jan. 22, 2009

(65) Prior Publication Data

US 2009/0195982 A1  Aug. 6, 2009

(30) Foreign Application Priority Data

Feb. 4, 2008  (TW) ............... 97104169 A

(51) Int. Cl.
*H05K 7/20* (2006.01)
*F01D 5/08* (2006.01)

(52) U.S. Cl. ............ 361/695; 361/694; 361/699; 165/80.4; 165/104.33; 165/122; 174/15.1; 415/175; 257/714

(58) Field of Classification Search ............... None
See application file for complete search history.

(56) References Cited

U.S. PATENT DOCUMENTS 6,377,458 B1 * 4/2002 Morris et al. ............ 361/699
7,455,504 B2 * 11/2008 Hill et al. ............ 416/179
7,548,421 B2 * 6/2009 Malone et al. ............ 361/695
7,578,661 B2 * 8/2009 Koeneman ............ 417/423.7
2007/0146988 A1 * 6/2007 Yamagishi et al. ........... 361/687

FOREIGN PATENT DOCUMENTS

| CN | 1054121 A | 8/1991 |
|---|---|---|
| CN | 2386360 Y | 7/2000 |
| CN | 2898687 Y | 5/2007 |
| CN | 2937569 Y | 8/2007 |
| CN | 200946577 Y | 9/2007 |

* cited by examiner

*Primary Examiner*—Boris L Chervinsky
(74) *Attorney, Agent, or Firm*—Morris, Manning & Martin LLP; Tim Tingkang Xia

(57) ABSTRACT

The invention discloses an electronic apparatus and a fan module thereof. The fan module includes a base, an impeller, a liquid container, an atomizing device and a cover. The impeller is provided in the base. The liquid container is placed at the center of the impeller, and the liquid container contains a liquid. The atomizing device is disposed on the liquid container, and the atomizing device can atomize the liquid to form a mist to spray in order to absorb the heat in the electronic apparatus. The cover covers the base and forms an air outlet with the base. Furthermore, the cover has an air inlet. When the impeller rotates, the blade of the impeller drives airflow mixed the heated mist to enter into the base through the air inlet of the cover, and to exit from the base through the air outlet.

10 Claims, 7 Drawing Sheets

ELECTRONIC APPARATUS AND FAN MODULE THEREOF

CROSS-REFERENCE TO RELATED APPLICATIONS

This non-provisional application claims priority under 35 U.S.C. §119(a) on Patent Application No. 097104169 filed in Taiwan on Feb. 4, 2008, the entire contents of which are hereby incorporated by reference.

BACKGROUND OF THE INVENTION

1. Field of the Invention

The invention relates to a fan module and, more particularly, to an electronic apparatus and a fan module thereof.

2. Description of the Prior Art

With the development of the electronic technology, electronic components are developed towards the trend of miniaturization and high-density. The heat produced during the operation of electronic components, such as the CPU of a computer, the chipset and so on, increases when they run. If the heat cannot be dissipated timely, the temperature of the electronic apparatus rises, which seriously affects the normal operation of the electronic components. At present, generally heat sinks or heat pipes are disposed on the electronic components to assist heat dissipation, and fans are disposed on the heat sinks to form heat-dissipating devices. The heat produced by the electronic components is removed by rapidly dissipating the heat of the heat sink through the airflow generated by the fan.

FIG. 1 is an outside view of a fan module 1 in the prior art. FIG. 2 is an exploded view of the fan module 1 in FIG. 1. The conventional fan module 1 includes a base 10, an impeller 12 and a cover 14. The impeller 12 includes a hub 120 and several blades 122. A holding base 100 is placed at the centre of the base 10, and the hub 120 of the impeller 12 is placed at the holding base 100. The cover 14 has an air inlet 140, and the cover 14 forms an air outlet 16 with the base 10. Generally, the hub 120 includes a motor (not shown) for driving the impeller 12 to rotate.

FIG. 3 is an outside view of a heat sink 30 placed with the fan module 1 in FIG. 1. Referring to FIG. 3, the heat sink 30 is connected with a heat pipe 32. The heat sink 30 has several fins 300. An electronic component (not shown) is placed at a holding base 4 on the heat pipe 32. The heat produced by the electronic component during operation is conducted to the heat sink 30 through the heat pipe 32.

During the operation of the fan module 1, the motor (not shown) drives the impeller 12 to rotate. The blade 122 drives airflow to enter into the base 10 through the air inlet 140 and to exit from the base 10 through the air outlet 16. Therefore, the heat of the heat sink 30 is removed.

However, as for the electronic apparatus which performance increases continuously, the heat dissipating method above cannot meet the requirement of heat dissipation gradually. Therefore, the problem of overheating of electronic apparatus occurs more frequently.

SUMMARY OF THE INVENTION

The invention provides a fan module for an electronic apparatus, which reduces temperature in the electronic apparatus utilizing mist.

According to one embodiment, the fan module of the invention includes a base, an impeller, a liquid container, an atomizing device and a cover. The fan module is provided in a housing of the electronic apparatus. The electronic apparatus includes at least one electronic component (such as CPU). The electronic component produces heat during operation, and heats the electronic apparatus.

In the embodiment, the impeller is provided in the base. The liquid container is placed at the center of the impeller and for containing a liquid. The atomizing device is disposed on the liquid container and for atomizing the liquid to form a mist to spray for absorbing the heat produced by the electronic component in the electronic apparatus. The cover covers the base and forms an air outlet with the base. Furthermore, the cover has an air inlet.

When the impeller rotates, the blade of the impeller drives airflow so that the mist is drawn into the base through the air inlet of the cover, and is drawn out of the base through the air outlet.

Therefore, the fan module of the invention not only has conventional dissipating method, but also utilizes mist for reducing temperature in electronic apparatus and draws the cooled air out of the housing of the electronic apparatus. Thereby, the heat dissipation effect in the electronic apparatus is promoted, and then, the requirement to heat dissipating is met. The frequency of the problem of electronic apparatus overheated happening is reduced.

These and other features, aspects, and advantages of the present invention will become better understood with regard to the following description, appended claims, and accompanying drawings.

BRIEF DESCRIPTION OF THE APPENDED DRAWINGS

The invention will become more fully understood from the detailed description given herein below illustration only, and thus is not limitative of the present invention, and wherein.

DETAILED DESCRIPTION OF THE INVENTION

Figure 1:
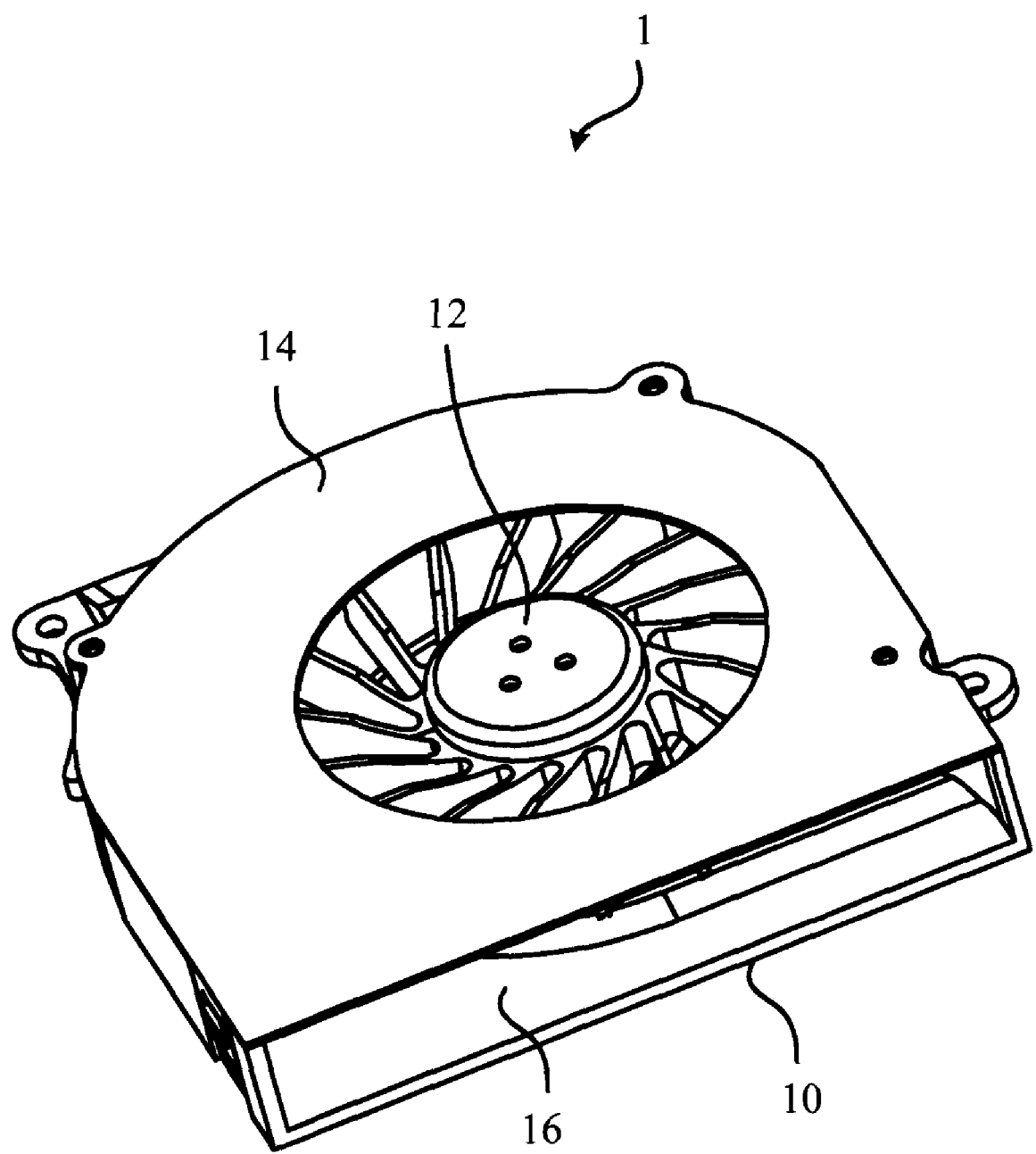
FIG. 1 is an outside view of a fan module in the prior art.
Figure 2:
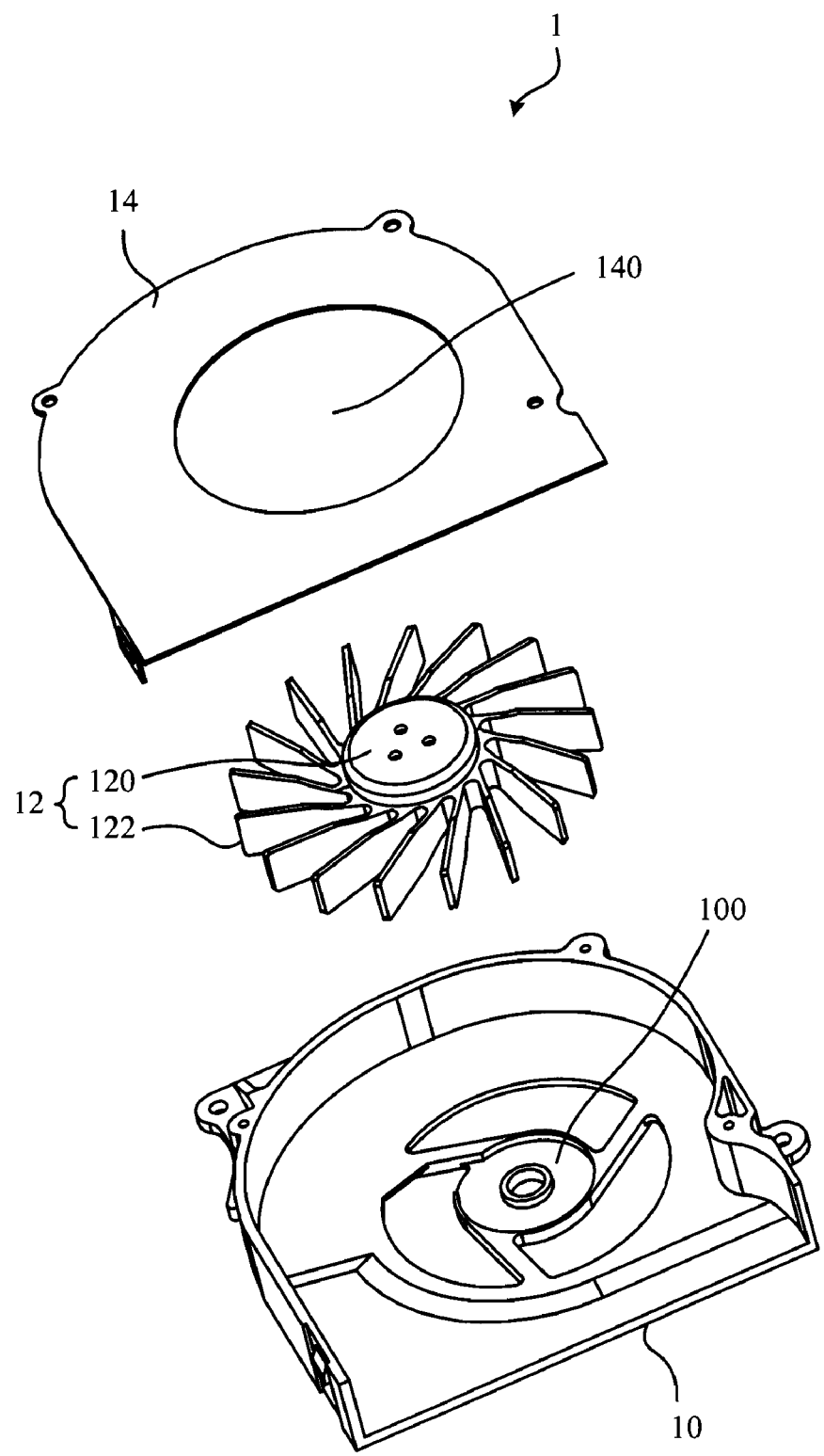
FIG. 2 is an exploded view of the fan module in FIG. 1.
Figure 3:
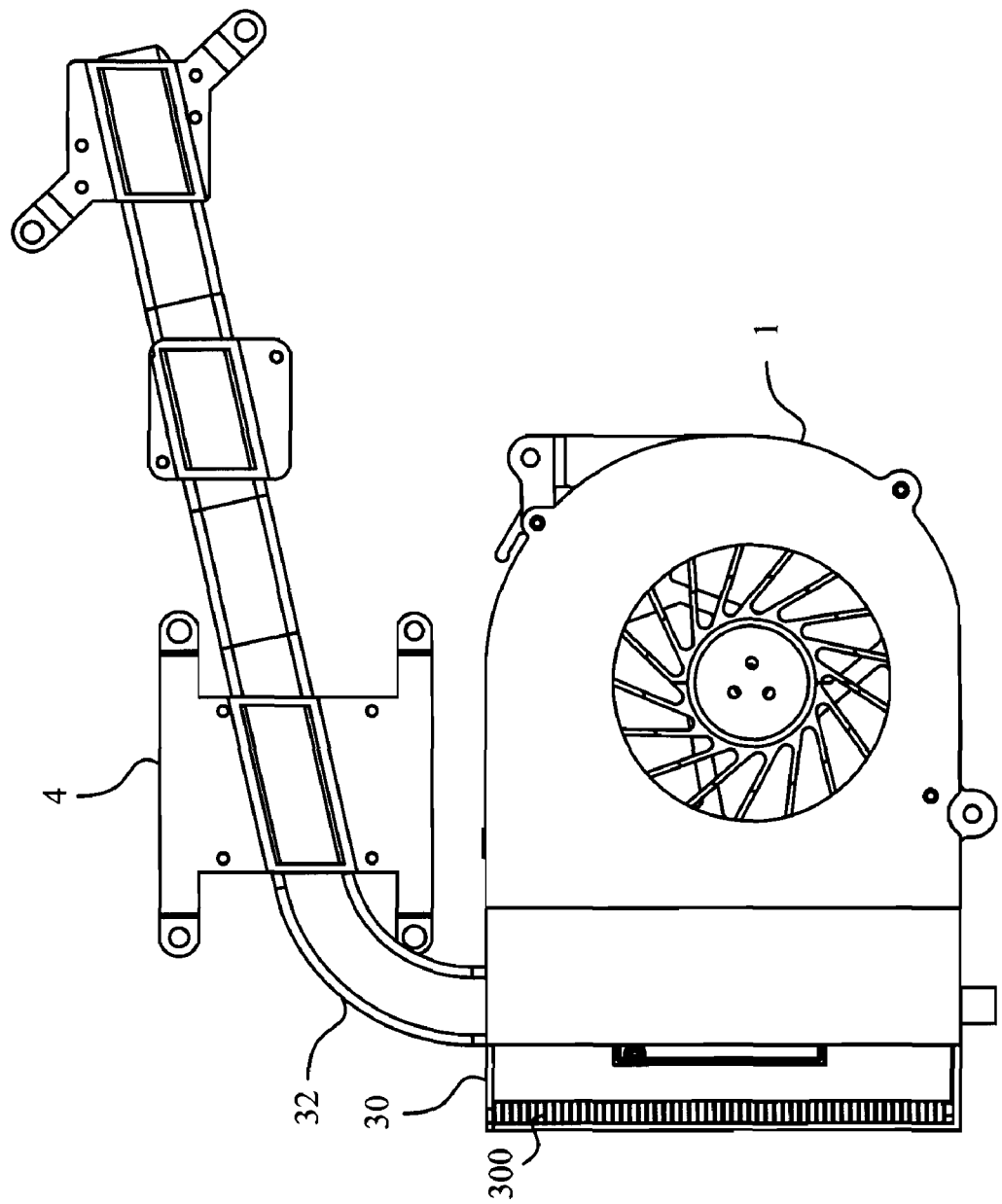
FIG. 3 is an outside view of a heat sink placed with the fan module in FIG. 1.
Figure 4:
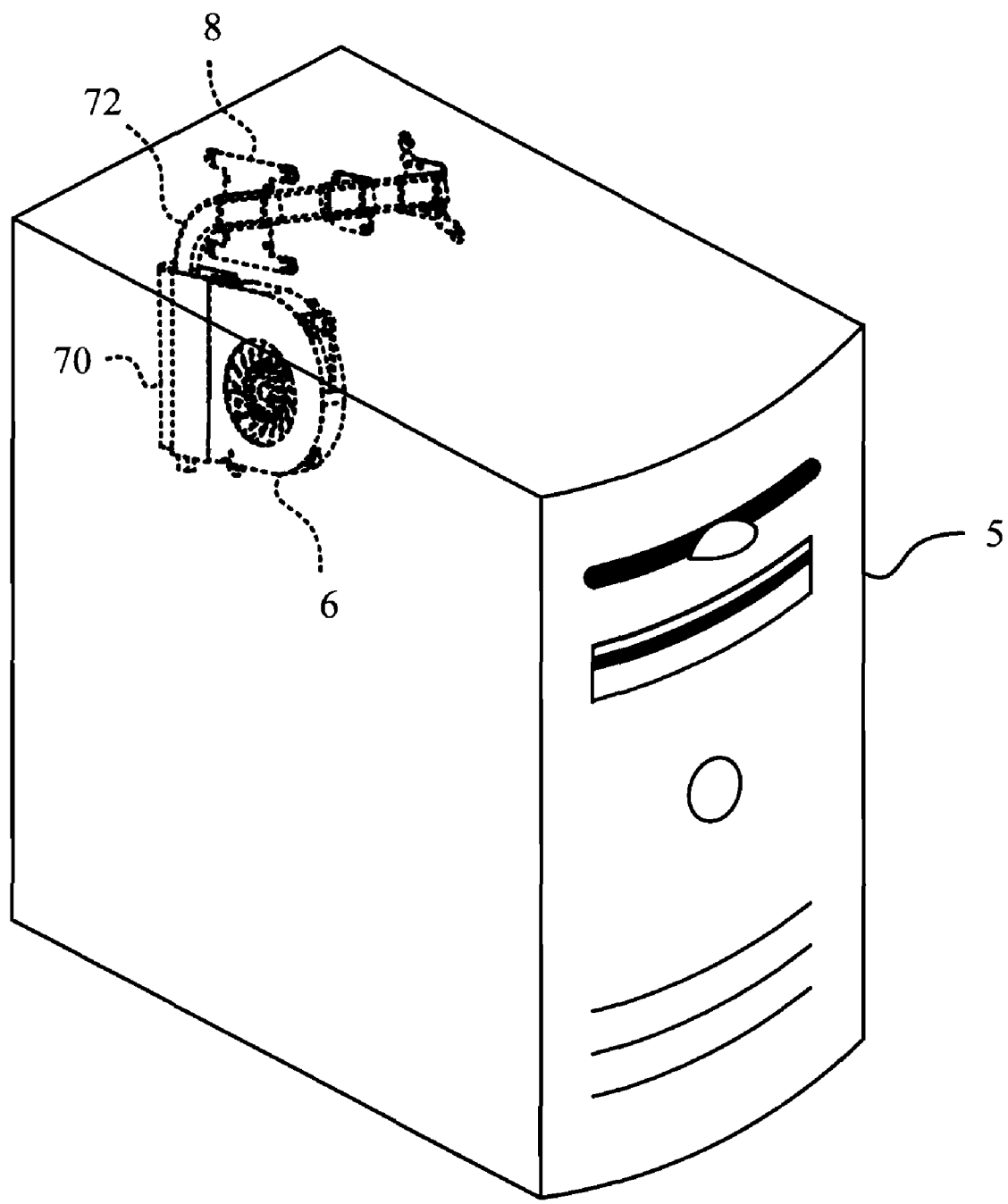
FIG. 4 is a schematic view of an electronic apparatus placed with the fan module according to a preferred embodiment of the invention.
Figure 5:
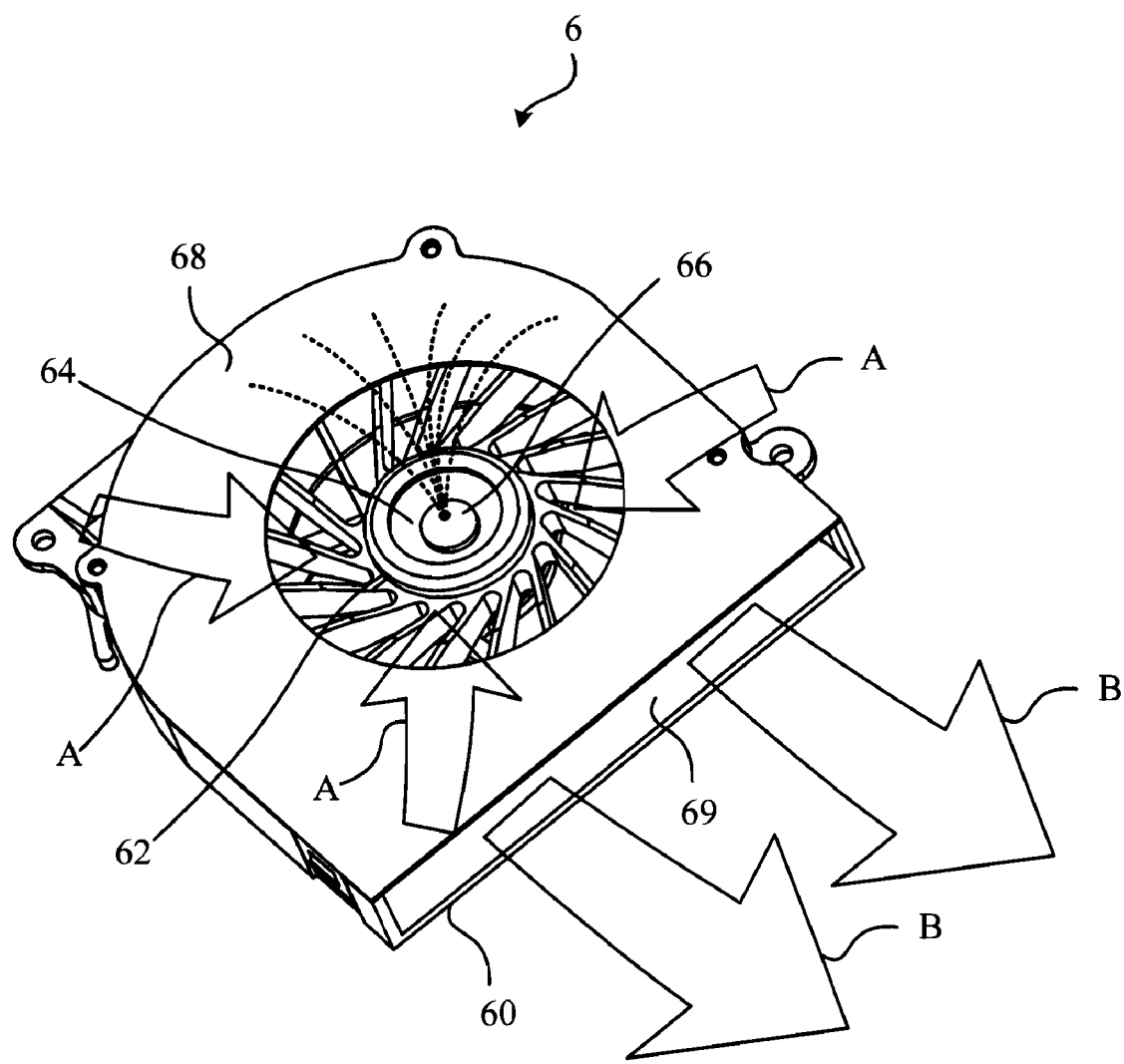
FIG. 5 is an outside view of the fan module in FIG. 4.
Figure 6:
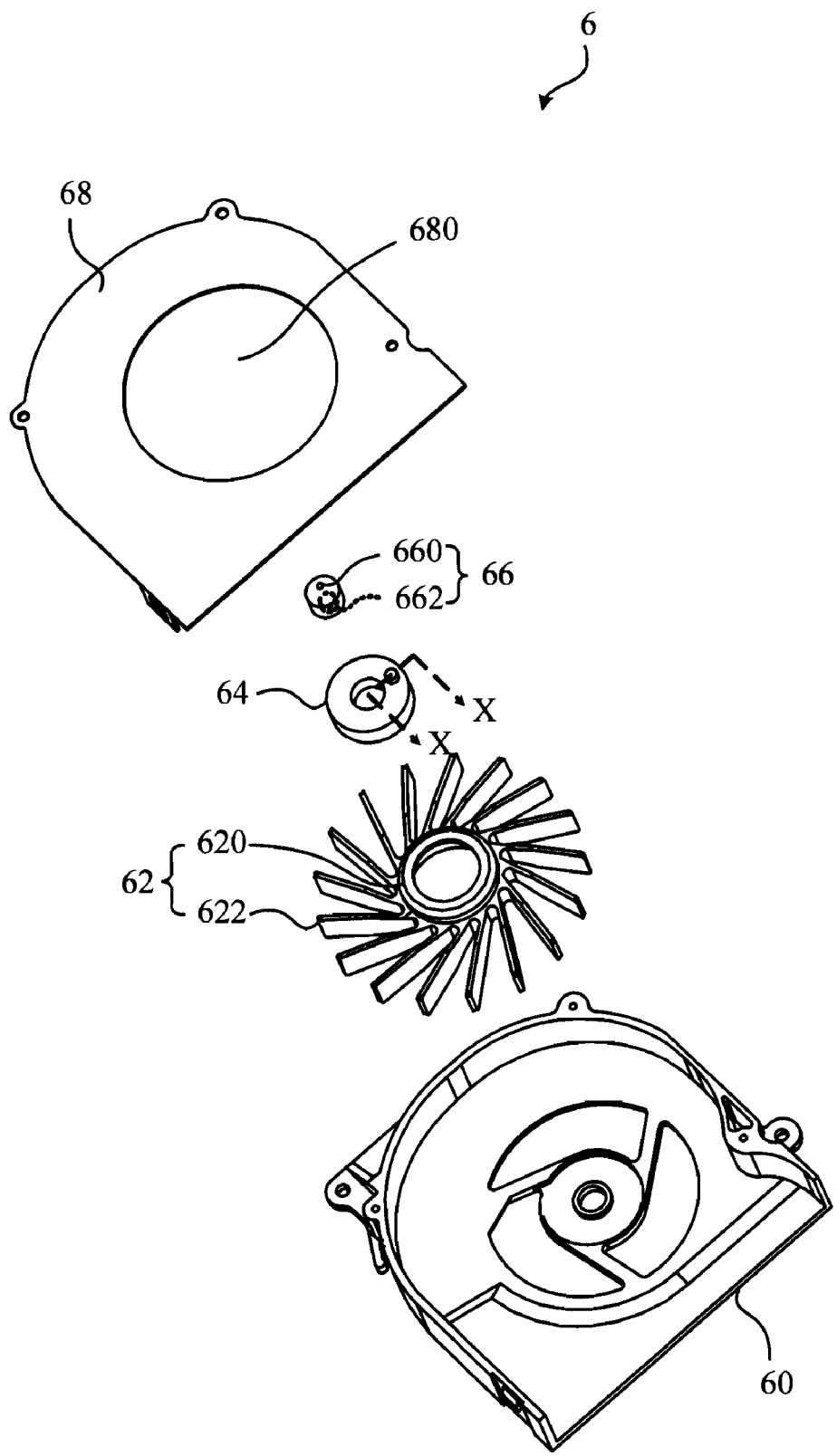
FIG. 6 is an exploded view of the fan module in FIG. 5.

FIG. 4 is a schematic view of an electronic apparatus 5 with a fan module 6 according to a preferred embodiment of the invention. FIG. 5 is an outside view of the fan module 6 in FIG. 4. FIG. 6 is an exploded view of the fan module 6 in FIG. 5. The fan module 6 of the preferred embodiment of the invention is adapted for being provided in electronic apparatuses for meeting various requirements of heat dissipation, such as a computer, a projector, and so on. The electronic apparatus 5 shown in FIG. 4 is a computer, and it is an example without limiting sense. In other preferred embodiments, the electronic apparatus 5 is a notebook computer.

Generally, the electronic apparatus 5 includes many electronic components (not shown) with different functions, such as CPU, graphics card, storage device, and so on. Every electronic component produces heat during operation, and then heats the electronic apparatus 5.

As shown in FIG. 4, except for the fan module 6 of the preferred embodiment of the invention, the electronic apparatus 5 is provided with a heat sink 70 and a heat pipe 72. The heat sink 70 is placed at the air outlet of the fan module 6, and the heat pipe 72 is connected with the heat sink 70. The heat sink 70 has several fins (not shown). An electronic component (not shown) is placed at a holding base 8 on the heat pipe 72. The heat produced by the electronic component during operation is conducted to the heat sink 70 through the heat pipe 72.

As shown in FIG. 5 and FIG. 6, the fan module 6 includes a base 60, an impeller 62, a liquid container 64, an atomizing device 66 and a cover 68. In the embodiment, the impeller 62 is provided in the base 60, and the impeller 62 includes a hub 620 and several blades 622. The liquid container 64 is placed at the center of the impeller 62, and the liquid container 64 contains a liquid. The atomizing device 66 is disposed on the liquid container 64 and can spray the liquid in the liquid container 64 in the form of mist for absorbing heat in the electronic apparatus 5. The cover 68 covers the base 60 and forms an air outlet 69 with the base 60. The heat sink 70 in FIG. 4 is placed at the air outlet 69 of the fan module 6. Furthermore, the cover 68 includes an air inlet 680.

Figure 7:
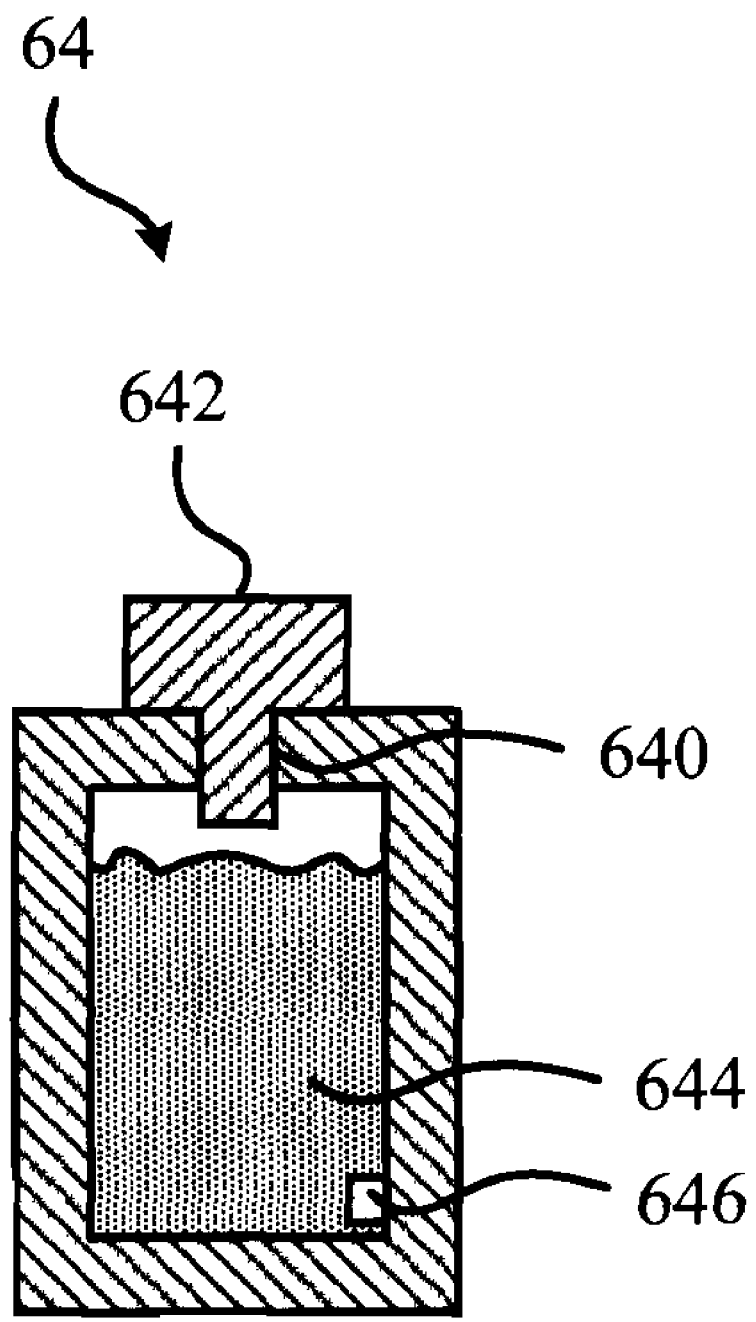
FIG. 7 is a cross-sectional view of the liquid container along the line X-X in FIG. 6.

FIG. 7 is a cross-sectional view of the liquid container 64 along the line X-X in FIG. 6. Referring to FIG. 7, the liquid container 64 includes an opening 640 and a stopper 642. The stopper 642 can be plugged detachably at the opening 640. In other words, when the liquid 644 in the liquid container 64 is used up, users can remove the stopper 642 and fill the liquid 644 into the liquid container 64 through the opening 640.

Furthermore, as shown in FIG. 7, the preferred embodiment of the invention may further include a detector 646 provided in the liquid container 64 for detecting the liquid level of the liquid 644. When the liquid 644 is nearly used up, the detector 646 sends an informing signal to the system for informing users appending the liquid 644. It is noted that the detector 646 is not the essential element to carry out the invention.

As shown in FIG. 6, the atomizing device 66 includes a nozzle 660 and a high-pressure pump 662. The high-pressure pump 662 presses the liquid 644 from the liquid container 64 to the nozzle 660 through pressure tubes. The nozzle 660 sprays the mist of the liquid 644 to reduce a general liquid drop to finer droplets. Generally, the bigger the power of the high-pressure pump 662, the bigger the pressure is.

For a liquid drop is dispersed to minute droplets by high pressure, relative to the same unit volume of the liquid 644, the surface area is expanded, and the heat conduction between liquid and air is increased. Therefore, more heat of spraying space is absorbed.

In practical application, the high-pressure pump 662 pumps the liquid from the liquid container 64 at a predetermined period (such as 3 seconds, 5 seconds and so on). As shown in FIG. 5, the mist produced by the atomizing device 66 (as broken lines shown in FIG. 5) can absorb surrounding heat effectively. At the same time, the impeller 62 is driven by a motor (not shown) to rotate, and then draws the heated mist into the base 60 through the air inlet of the cover 68 (as airflow A shown in FIG. 5), and draws the mist out of the base 60 through the air outlet 69 (as airflow B shown in FIG. 5). Thereby, the inner temperature of the electronic apparatus is reduced effectively.

Furthermore, except for water, the liquid in the liquid container 64 may be perfume, essential oil or other odorant liquids. In other words, users can select different liquid according to personal preference. During the operation period of the electronic apparatus, the heat dissipation efficiency is improved, and users can be in the atmosphere they like.

Compared to the prior art, the fan module according to the embodiment of the invention not only uses conventional dissipating method, but also utilizes mist for reducing temperature in electronic apparatus and draws the cooled air out of the housing of the electronic apparatus. Thereby, the heat dissipation effect in the electronic apparatus is promoted, and then, the requirement to heat dissipating is met. The frequency of the problem of electronic apparatus overheated happening is reduced. Furthermore, users can add odorant liquids into the liquid container for increasing the joy in using.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A fan module for an electronic apparatus, the fan module comprising:
   a base;
   an impeller provided in the base;
   a liquid container placed at the center of the impeller and for containing a liquid;
   an atomizing device disposed on the liquid container and for atomizing the liquid to form a mist to spray in order to absorb the heat produced by the electronic apparatus; and
   a cover having an air inlet and covering the base and forming an air outlet with the base,
   wherein when the impeller rotates, the mist is drawn into the base through the air inlet and is drawn out of the base through the air outlet.

2. The fan module according to claim 1, wherein the atomizing device includes:
   a nozzle; and
   a high-pressure pump for transporting the liquid from the liquid container to the nozzle.

3. The fan module according to claim 2, wherein the high-pressure pump pumps the liquid at a predetermined period.

4. The fan module according to claim 1, wherein the liquid container includes:
   an opening for filling the liquid into the liquid container through the opening; and
   a stopper plugging detachably the opening.

5. The fan module according to claim 1, further comprising a detector provided in the liquid container for detecting the liquid level of the liquid.

6. An electronic apparatus, comprising:
   a housing;
   an electronic component provided in the housing;
   a fan module provided in the housing, wherein the fan module includes:
   a base;
   an impeller provided in the base;
   a liquid container placed at the center of the impeller and for containing a liquid;
   an atomizing device disposed on the liquid container and for atomizing the liquid to form a mist to spray in order to absorb the heat produced by the electronic component; and
   a cover having an air inlet and covering the base and forming an air outlet with the base;

wherein when the impeller rotates, the mist is drawn into the base through the air inlet and is drawn out of the base through the air outlet.

7. The electronic apparatus according to claim 6, wherein the atomizing device includes:
   a nozzle; and
   a high-pressure pump for transporting the liquid from the liquid container to the nozzle.

8. The electronic apparatus according to claim 7, wherein the high-pressure pump pumps the liquid at a predetermined period.

9. The electronic apparatus according to claim 6, wherein the liquid container includes:
   an opening for filling the liquid into the liquid container through the opening; and
   a stopper plugging detachably the opening.

10. The electronic apparatus according to claim 6, wherein the fan module further includes a detector provided in the liquid container for detecting the liquid level of the liquid.

* * * * *